(12) United States Patent
Case et al.

(10) Patent No.: US 8,960,224 B2
(45) Date of Patent: Feb. 24, 2015

(54) VALVE POSITION TRANSLATOR

(75) Inventors: William T. Case, Little Rock, AR (US); Robert H. Wolf, Conway, AR (US)

(73) Assignee: Cameron International Corporation, Houston, TX (US)

( * ) Notice: Subject to any disclaimer, the term of this patent is extended or adjusted under 35 U.S.C. 154(b) by 695 days.

(21) Appl. No.: 13/212,687

(22) Filed: Aug. 18, 2011

(65) Prior Publication Data

US 2013/0043420 A1 Feb. 21, 2013

(51) Int. Cl.
*F16K 31/44* (2006.01)

(52) U.S. Cl.
CPC ............................. *F16K 31/44* (2013.01)
USPC .......... 137/554; 137/553; 137/556; 137/555; 251/229; 251/215; 251/252

(58) Field of Classification Search
CPC ...................................................... F16K 31/44
USPC .................................................. 137/553, 556
See application file for complete search history.

(56) References Cited

U.S. PATENT DOCUMENTS

| | | | |
|---|---|---|---|
| 4,195,816 A | 4/1980 | Thompson et al. | |
| 4,235,258 A | 11/1980 | Uno et al. | |
| 4,623,119 A | 11/1986 | van der Wiel | |
| 4,666,124 A | 5/1987 | Giacobbi | |
| 5,005,805 A * | 4/1991 | Morris et al. | 251/229 |
| 5,542,644 A | 8/1996 | Smith | |
| 6,276,394 B1 * | 8/2001 | Smith et al. | 137/556 |
| 6,648,006 B1 * | 11/2003 | Ostergaard | 137/241 |
| 7,350,535 B2 * | 4/2008 | Liepold et al. | 137/68.19 |
| 7,609,056 B2 * | 10/2009 | Junk et al. | 324/207.25 |
| 8,690,120 B2 * | 4/2014 | Hartnett et al. | 251/252 |

OTHER PUBLICATIONS

Cameron, "General Valve Twin Seal," Jul. 2010, Houston, TX., 28 pages.
PCT International Search Report and Written Opinion for PCT/US2012/050778, dated Nov. 28, 2012.

* cited by examiner

*Primary Examiner* — John K Fristoe, Jr.
*Assistant Examiner* — Christopher Ballman
(74) *Attorney, Agent, or Firm* — Chamberlain Hrdlicka

(57) ABSTRACT

Apparatus for determining whether a valve is fully opened or closed. In one embodiment a valve position translator includes a cam tube and a rod. The cam tube has a cylindrical wall. A first slot in the wall is disposed along a radial arc of the tube. A second slot in the wall extends from an end of the first slot at an angle acute to the first slot. The rod extends through the wall, and rotates the cam tube while moving linearly along the cam tube in the second slot and while moving in an arc in the first slot.

12 Claims, 4 Drawing Sheets

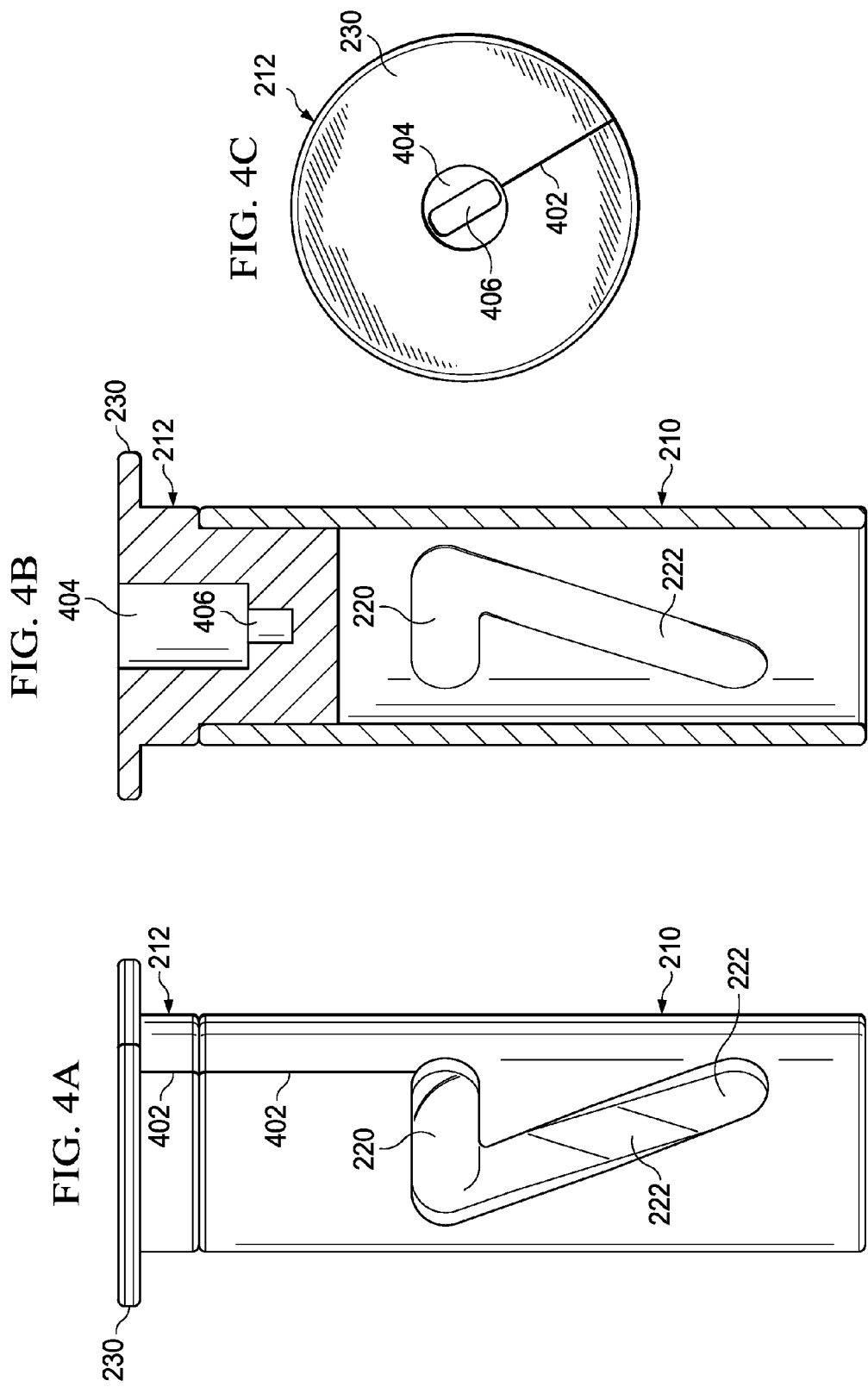

VALVE POSITION TRANSLATOR

BACKGROUND

Plug valves are commonly used to control the flow of fluids, such as hydrocarbon fluids, in pipelines and other flow containment structures. Some plug valves include slips and seals in a seat and reseat configuration. The slips are mounted to a central plug. The slips and seals operate to block fluid flow through the valve at both the inlet and outlet ports when the valve is closed. Such dual sealing action advantageously allows bleeding of the valve body while the valve is closed.

When the valve is open the slip seals are entirely removed from the fluid flow through the valve. When the valve transitions from the open position to the closed position, the plug and attached slips are first rotated 90°. Clearance between the slips and the valve body is maintained throughout the rotation to reduce actuation torque and prevent seal abrasion. When the slips are radially aligned with the inlet and outlet ports, the plug is lowered forcing the slips against the valve body and sealing the inlet and outlet ports.

When the valve transitions from the closed position to the open position the sequence is reversed. First, the plug is raised, retracting the slips from the valve body. Thereafter, the plug and slips are rotated 90° to align a flow passage through the plug with the inlet and outlet ports. Thus, both linear and rotational motion of the plug is required to open or close the valve.

A plug valve assembly may include a switching unit that monitors valve position and provides visual valve position indications and/or electrical signals indicative of the valve position to control and/or monitoring devices communicatively coupled to the switching unit.

SUMMARY

Apparatus for accurately determining whether a valve is fully opened or closed is disclosed herein. In one embodiment a valve position translator includes a cam tube and a rod. The cam tube has a cylindrical wall. A first slot in the wall is disposed along a radial arc of the tube. A second slot in the wall extends from an end of the first slot at an angle acute to the first slot. The rod extends through the wall, and rotates the cam tube while moving linearly along the cam tube in the second slot and while moving in an arc in the first slot.

In another embodiment, a valve assembly includes a valve, a valve position translator, and a valve position indicator. The valve includes a plug that moves linearly and rotationally to open and close the valve. The valve position translator is mounted to the valve. The valve position indicator is mounted to the valve position translator. The valve position indicator is rotatable to represent the position of the valve based on rotary motion provided to the valve position indicator. The valve position translator combines linear and rotary motion of the plug to produce rotary motion indicative of the valve fully opening or closing and provides the produced rotary motion to the valve position indicator.

In a further embodiment, a valve motion converter includes a rod disposed in a cam tube. A first guide feature of the tube is disposed to convert linear motion of the rod to rotary motion of the tube. A second guide feature of the tube extends at an angle from the first guide feature. The second guide feature is disposed to transfer rotary motion of the rod to the tube.

BRIEF DESCRIPTION OF THE DRAWINGS

For a detailed description of exemplary embodiments of the invention, reference will now be made to the accompanying drawings in which:

FIGS. 4A-4C show views of a cam tube of the valve position translator in accordance with various embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Both linear and rotary motion may be required to open or close a valve. Unfortunately, a switching unit coupled to the valve may be responsive only to plug rotation, rather than to both linear and rotary motion of the plug. Consequently, such switching units cannot accurately ascertain whether the valve is fully opened or closed when both linear and rotary plug motion are required.

Accurate determination of whether a valve is fully opened or closed is important for a variety reasons. For example, performance of flow calibration requires that valves be fully closed. Otherwise, flow through the valves can corrupt the calibration producing inaccurate fluid flow measurements.

Embodiments of the present disclosure incorporate a valve position translator that allows for consideration of both linear and rotary plug motion by a switching unit configured to determine valve position based solely on plug rotary motion. Thus, embodiments allow accurate determination of valve position using such switching units.

Figure 1:
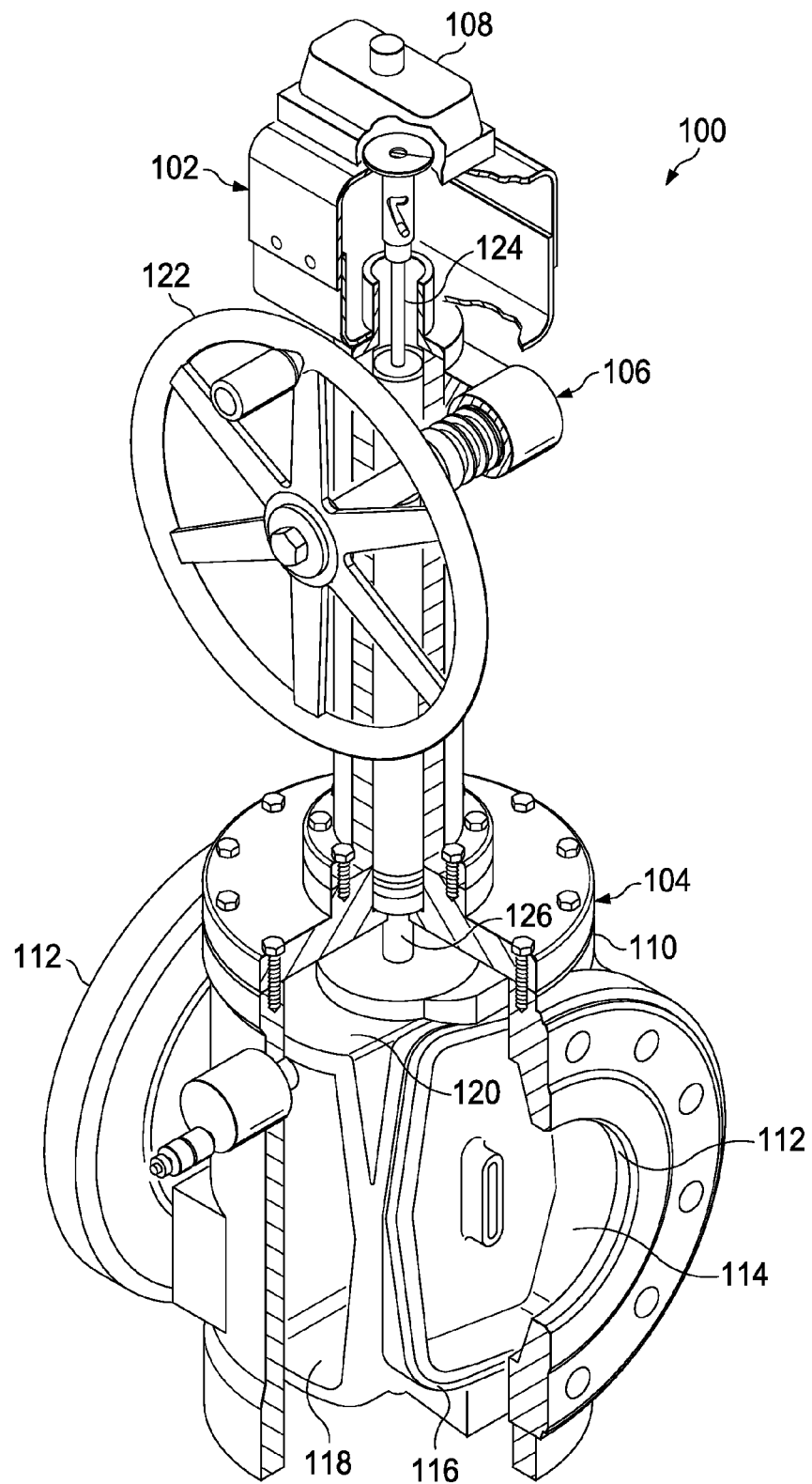
FIG. 1 shows a valve assembly including a valve position translator in accordance with various embodiments.

FIG. 1 shows a valve assembly 100 including a valve position translator 102 in accordance with various embodiments. The valve assembly 100 also includes a valve 104, a valve operator 106, and a switching unit (valve position indicator) 108. The valve 104 includes a valve body 110 and plug 120. In FIG. 1, portions of the valve body 110 and the operator 106 are cut away to show internal features. The valve body 110 includes inlet and outlet ports 112. The plug 120 includes a passage 118 through which fluid passes between the inlet and outlet ports 112 when the port 112 are aligned with the passage 118. Slips 114 are fixed to opposite sides of the plug 120. Seals 116 are secured to each slip 114. The slips 114 close the valve by sealing the inlet and outlet ports 112.

The operator 106 is coupled to the valve body 104 and controls movement of the plug 120. The embodiment of the operator 106 shown in FIG. 1 includes a handwheel 122. The handwheel 122 turns gears in the operator 106 that engage a shaft 126 to rotate, raise, and lower the plug 120 as the valve 104 is opened or closed. Other embodiments of the operator 106 may provide means other than the handwheel 122 for actuating the operator 106, e.g., an electric motor, a hydraulic motor, etc.

A shaft 124 extends from the operator 106. The shaft 124 is rotated, extended, or retracted in correspondence with movement of the plug 120. Thus, movement of the shaft 124 reflects movement of the plug 120. As the operator 106 rotates the plug 120, the shaft 124 is rotated over the same arc as the plug. As the operator moves the plug 120 vertically, the shaft 124 is vertically displaced by an equivalent amount.

The valve position translator 102 is coupled to the operator 106. The shaft 124 provides plug motion input, in the form of rotary and linear motion of the shaft 124, to the valve position translator 102. The valve position translator 102 is also coupled to the switching unit 108. In some embodiments, the switching unit 108 may be a VALVETOP Rotary Position Monitor manufactured by TOPWORX, Inc, or other valve position indicator. The valve position translator 102 converts linear motion of the shaft 124 to rotary motion that drives the switching unit 108, and transfers, at least a portion, of the rotary motion of the shaft 124 to the switching unit 108. The valve position translator 102 is configured to provide the switching unit 108 with an arc of rotation indicative to the switching unit 108 of complete transition between open and closed valve positions. The valve position translator generates this arc of rotation based on a total combined linear and rotary displacement of shaft 124. Thus, the valve position translator 102 provides rotation indicative of a complete transition between open and closed positions of the valve 104, only when the shaft 124 (and the plug 120) has been fully displaced both linearly and rotationally. For example, if 90° of rotation are required at the input of the switching unit 108 to indicate complete transition between open and closed positions of the valve 104, then the valve position translator 102 provides the 90° of rotation to the switching unit 108 only when the shaft 124 is rotated 90° and the shaft 124 is fully extend or retracted (as required by the open or closed valve position) by the operator 106.

Figure 2:
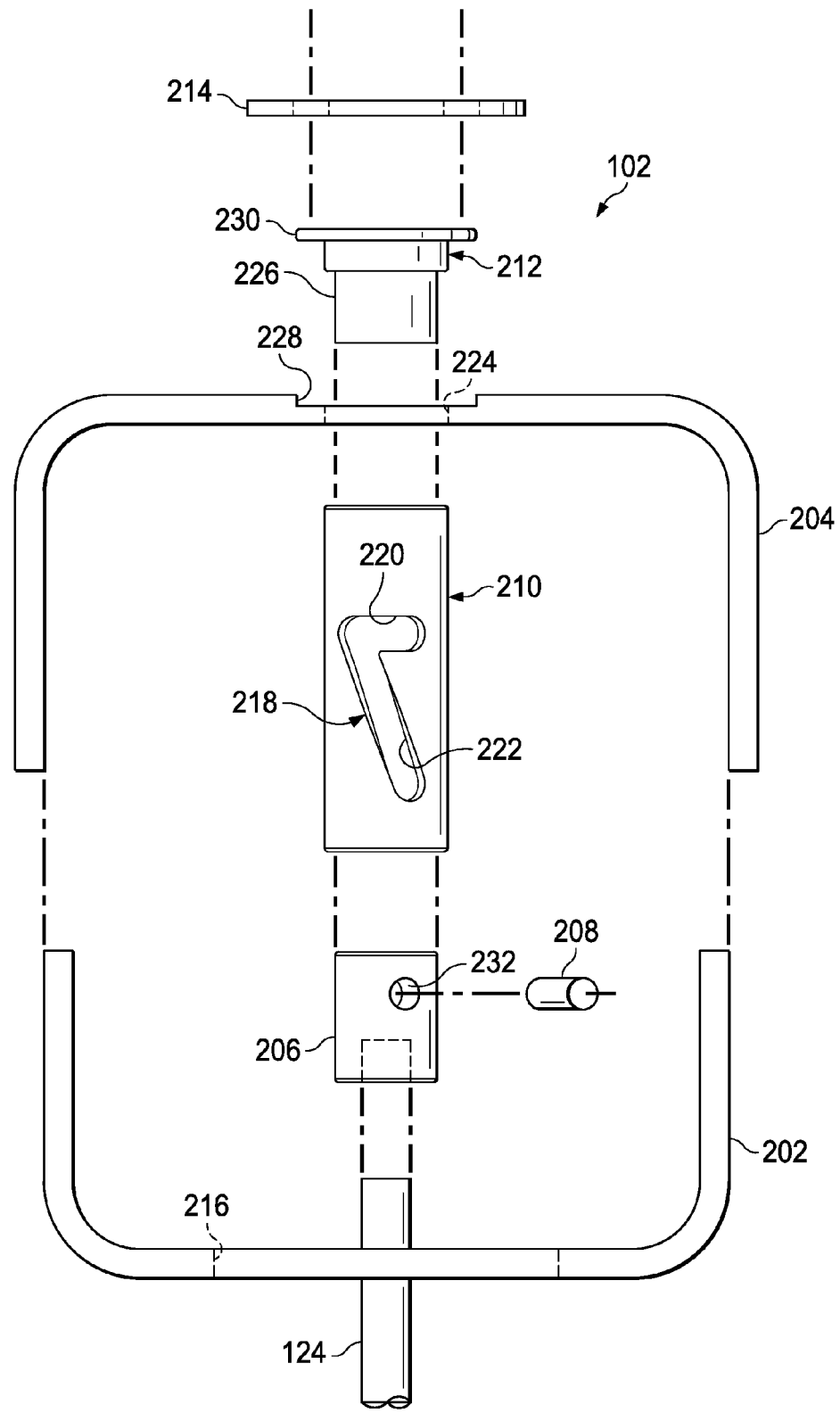
FIG. 2 shows an exploded view of the valve position translator assembly in accordance with various embodiments.

FIG. 2 shows an exploded view of the valve position translator 102 in accordance with various embodiments. The valve position translator 102 includes a mounting bracket including a lower section 202 and an upper section 204. The lower section 202 of the mounting bracket is attached to the operator 106 via bolts or other attachment means. An opening 216 in the lower section 202 allows the shaft 124 to pass through the mounting bracket. The upper section 204 of the mounting bracket is attached to the lower section 202 via bolts or other attachment means.

A connector 206 is secured to the shaft 124 by means of a set screw or other attachment device. A passage 232 through the connector 206 is dimensioned to hold a rod 208 that extends from the passage 232 on opposing sides of the connector 206. The rod 208 may be secured in the connector 206 by a set screw or other attachment devices known in the art.

The connector 206 is disposed within the bore of a cam tube 210. The connector 206 and the bore of the cam tube 210 are dimensioned to allow the connector 206 to rotate and move longitudinally within the bore of the cam tube 210 in response to rotation and linear displacement of the shaft 124.

The cam tube 210 includes a set of slots 218 within which the ends of the rod 208 extending from the connector 206 are disposed. A first slot 220 is disposed along a radial arc of the cam tube 210. A second slot 222 is disposed at an acute angle to first slot 220. The first and second slots 220, 222 intersect at one end of each slot.

A position indicator adapter 212 extends through a passage 224 in the upper section 204 of the mounting bracket. A portion 226 of the adapter 212 is dimensioned to fit within the bore of the cam tube 210. The adapter 212 may be secured to the cam tube 210 via welding or other attachment method known in the art. A flange 230 of the adapter 212 is retained within a counterbore 228 of the upper section 204 of the mounting bracket by a retaining plate 214. The retaining plate 214 is secured to the upper section 204 of the mounting bracket by bolts or other attachment devices. The adapter 212 rotates freely within the passage 224 and the counterbore 228.

Figure 3A:
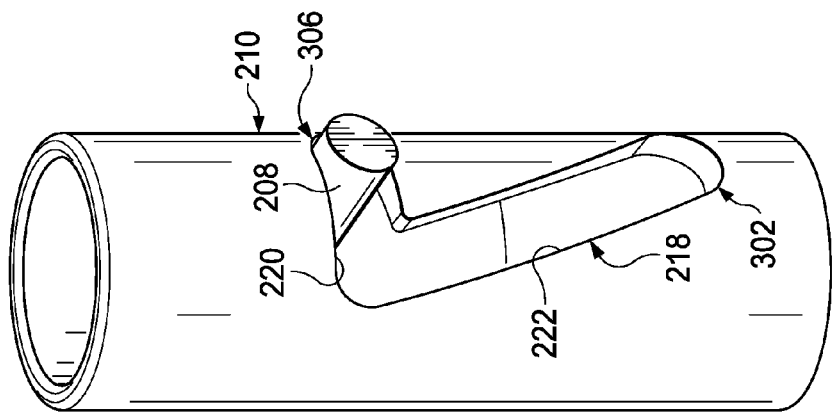
FIGS. 3A-3C show locations of valve position translator components as a valve is opened or closed in accordance with various embodiments.
Figure 3B:
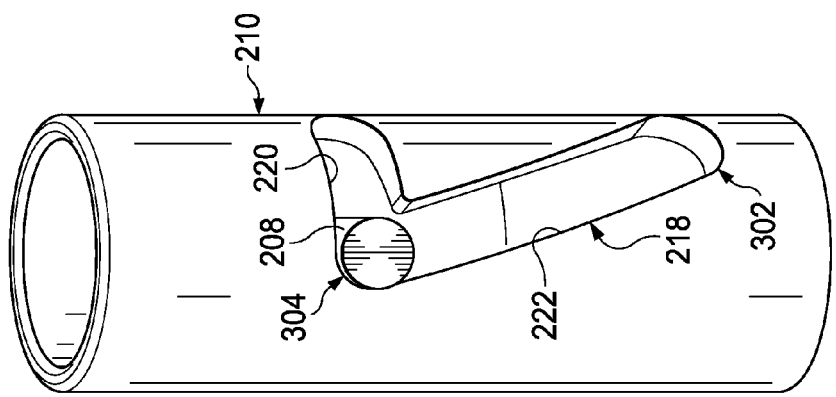
Figure 3C:
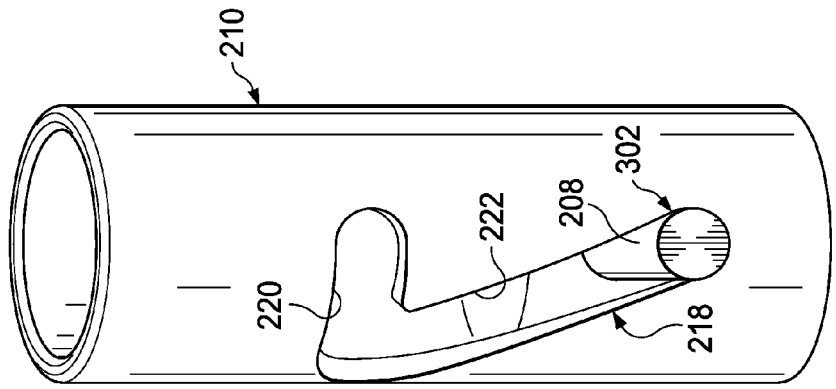

Referring now to FIGS. 3A-3C, operation of the valve position translator 102 is outlined. When the valve 104 is fully closed, the rod 208 is positioned at location 302 (i.e., the bottom of the second slot 222) as shown in FIG. 3A. As the valve 104 begins to open, the plug 120 is raised within the valve body 110 causing the shaft 124 to linearly extend from the operator 106. As the rod 208 moves upward within the cam tube 210, the rod 208 maintains its lateral position and the cam tube 210 rotates counterclockwise (as viewed from the top of the cam tube 210). When the shaft 124 is fully extended, the rod 208 is positioned at location 304 (i.e., the intersection of slots 220 and 222) as shown in FIG. 3B, and the cam tube 210 has been rotated counterclockwise by an amount determined by the slope of slot 222. In some embodiments of the cam tube 210, slot 222 is configured such that linear motion of the shaft 124 from location 302 to location 304 causes the cam tube 210 to rotate approximately 45°. In other embodiments linear displacement of the shaft 124 may induce a different amount of cam tube rotation.

When the plug 120 has been fully raised (i.e., the shaft 124 fully extended), the operator 106 begins to rotate the plug 120. The plug 120 and shaft 124 rotate in a counterclockwise direction during valve opening. As the rod 208 moves laterally in the slot 220, the cam tube 210 remains stationary until the rod 208 engages the end of the slot 220 at position 306 as shown in FIG. 3C. In some embodiments, the length of the slot 220 is equivalent to the arc of rotation induced by the slot 222.

After the rod 208 engages the end of the slot 220, the cam tube 210 rotates in conjunction with the shaft 124 throughout the remainder of the plug/shaft rotation. Consequently, the cam tube 210 transfers the terminal portion of the rotary motion of the shaft 124 to the switching unit 108, while the initial portion of the shaft rotary motion is disregarded. In some embodiments of the cam tube 210, rotation of the shaft 124 is transferred to the switching unit 108 only during the terminal 45° of shaft (plug) rotation. The total cam tube rotation produced by the linear and rotational movement of the shaft 124 is equivalent to the arc of rotation that the switching unit 108 requires to deem the valve fully open.

When the valve 104 transitions from the fully open to the fully closed position, the sequence of operations described above is generally reversed. The rod 208 is positioned at the end of slot 220 in position 306 when the valve 104 is fully open. The operator 106 initiates closure of the valve 104 by rotating the plug 120 in a clockwise direction. As the shaft 124 rotates in the clockwise direction, moving the rod 208 laterally in the slot 220, the cam tube 210 remains stationary until the rod 208 reaches the intersection of the slots 220 and 222. When the rod 208 reaches the intersection of the slots 220 and 222, the cam tube 210 is rotated in the clockwise direction through the remainder of the shaft rotation.

When the operator 106 has fully rotated the plug 120 into alignment with the inlet and outlet ports 112, the operator 106 lowers the plug 120 to move the slips 114 into sealing position. As the plug 120 is lowered, the shaft 124 is retracted into the operator 106 causing the cam tube 210 to rotate in the clockwise direction as the rod 208 moves from location 304 to location 302. Thus, the cam tube 210 rotates through a terminal portion of the rotation of the shaft 124 and through the linear retraction of the shaft 124. The total cam tube rotation produced by the linear and rotational movement of the shaft 124 is equivalent to the arc of rotation that switching unit 108 requires to deem the valve fully closed.

FIGS. 4A-4C show views of a cam tube 210 and adapter 212 of the valve position translator 102 in accordance with various embodiments. FIG. 4A shows a front view of the joined cam tube 210 and adapter 212. The cam tube 210 and the adapter 212 include an alignment feature 402 that specifies the relative orientation of the tube 210 and adapter 212 for joining. FIG. 4A also shows slots 220 and 222 on opposing sides of the cam tube 210. The rod 208 extends through the slots 220, 222 on both sides of the cam tube 210.

FIG. 4B shows a cross-sectional view of the joined cam tube 210 and adapter 212. The slots 220, 222 in the back of the cam tube 210 are shown. The adapter 212 includes a cavity 404 for holding a mating feature of the switching unit 108. The bottom of the cavity 404 includes a groove 406 or other feature through which rotation is transferred from the adapter 212 to the switching unit 108. The cavity 404 and the groove 406 may be dimensioned to receive a shaft provided by the switching unit 108 in accordance with the NAMUR standard. Other embodiments of the adapter 212 may support different coupling standards or arrangements. FIG. 4C shows a top view of the adapter 212 including the cavity 404 and the groove 406. The orientation of the slot groove relative to the alignment feature 402 and the slots 220, 222 is also shown.

The above discussion is meant to be illustrative of the principles and various embodiments of the present invention. Numerous variations and modifications will become apparent to those skilled in the art once the above disclosure is fully appreciated. For example, while embodiments are described herein as including slots that allow the rod 208 to pass through the wall of the cam tube 210, in some embodiments the slots may be grooves or other guide features in the cam tube wall, and the rod 208 disposed in the guide features. Furthermore, those skilled in the art will understand that embodiments encompass different sequences of linear and rotary plug motion, conversion of differing amounts of linear displacement to rotation, and provision of various amounts of rotation to a switching unit. It is intended that the following claims be interpreted to embrace all such variations and modifications.

What is claimed is:

1. A valve position translator, comprising:
   a cam tube comprising a cylindrical wall, a first slot in the wall disposed along a radial arc of the cam tube and a second slot in the wall extending from an end of the first slot at an angle acute to the first slot; and
   a rod disposed through the wall, the rod rotates the cam tube while moving linearly along the cam tube in the second slot and while moving in an arc in the first slot.

2. The valve position translator of claim 1, further comprising an indicator adapter joined to one end of the cam tube, the adapter configured to mate with a valve position indicator.

3. The valve position translator of claim 2, wherein the indicator adapter and the cam tube each comprise an alignment feature to align the tube and valve position indicator mating feature of the adapter.

4. The valve position translator of claim 2 further comprising a mounting bracket comprising a recessed top surface that retains and allows rotation of the indicator adapter.

5. The valve position translator of claim 1 wherein the cam tube has third and fourth slots circumferentially opposite the first and second slots, the third slot in the wall disposed along a radial arc of the cam tube and the fourth slot in the wall extending from an end of the third slot at an angle acute to the third slot; and wherein the rod is disposed in the third slot for rotational motion of the valve plug and in the fourth slot for linear motion of the valve plug.

6. The valve position translator of claim 1 wherein the first slot is dimensioned to inhibit rotation of the cam tube over an initial portion of the rotational arc of the valve plug, and to rotate the cam tube over a final portion of the valve plug rotation.

7. The valve position translator of claim 1 wherein the second slot rotates the cam tube over a full extent of linear motion of the valve plug.

8. The valve position translator of claim 1 wherein the arc of cam tube rotation induced by motion of the rod in the second slot is equivalent to the arc of valve plug rotation over which cam tube rotation is inhibited by the first slot.

9. The valve position translator of claim 1 wherein rotation of the cam tube induced by the linear and rotational motion of the rod in the first and second slots is equivalent to the rotation of the valve plug.

10. The valve position translator of claim 1 further comprising a connector disposed within the cam tube, the connector coupling the rod to the valve plug.

11. The valve motion converter of claim 1, wherein the rotary motion of the tube generated by the converted linear motion of the rod and the transferred rotation of the rod is equivalent to rotary motion of the rod.

12. The valve motion converter of claim 1, wherein the second slot is disposed to transfer only a terminal portion of the rotary motion of the rod to the tube.

* * * * *